Figure 1:
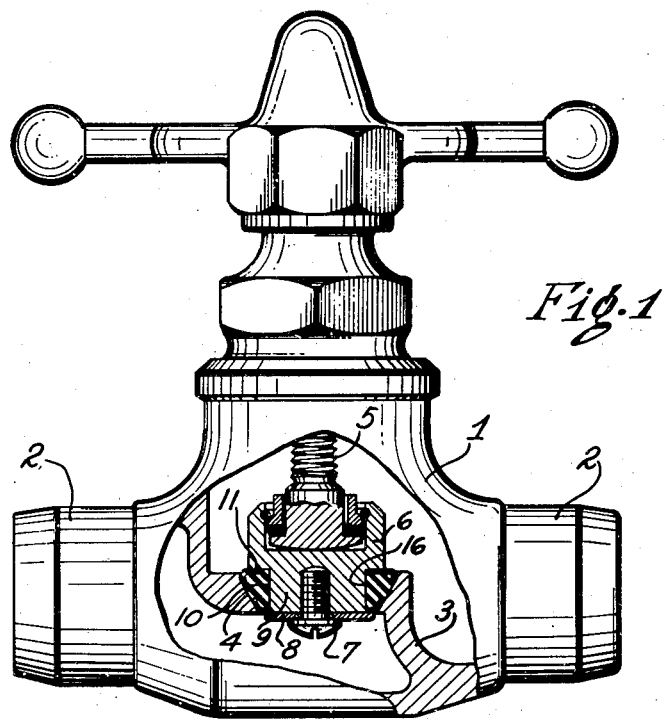

Dec. 28, 1948.  F. J. RAYBOULD  2,457,492
VALVE
Filed May 22, 1944

INVENTOR.
FRANK J. RAYBOULD
BY Richey & Watts
ATTORNEYS

Patented Dec. 28, 1948

2,457,492

UNITED STATES PATENT OFFICE 2,457,492

VALVE

Frank J. Raybould, Lakewood, Ohio, assignor to The Weatherhead Company, Cleveland, Ohio, a corporation of Ohio Application May 22, 1944, Serial No. 536,655

2 Claims. (Cl. 251—159)

This invention relates generally to valves for controlling fluid under pressure and particularly to a resilient, radially expansible and contractible valve seal.

The principal objects of this invention are to increase the valve sealing force in proportion to any increase in pressure applied to the valve; to minimize sliding motion of the deformable portion of the seal against the valve seat under pressure; and to maintain maximum durability and simplicity of the valve. Other objects will appear hereinafter.

Figure 2:
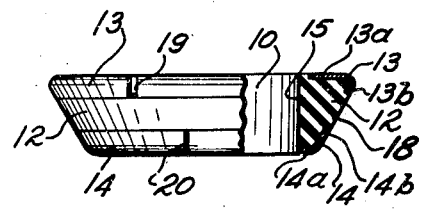

In the drawings accompanying and forming a part of this specification:

Fig. 1 is an elevational view, with portions shown in section, of one form of valve embodying the present invention; and Fig. 2 is an elevational view, partly in section, of the valve seal of Fig. 1.

The invention has been illustrated as applied to a globe valve of a conventional type, but it is to be understood that it is applicable to any desired type of valve. Fig. 1 shows a valve body 1 having tubular portions 2 to be connected to fluid carrying tubes and an interior web 3 provided with a fluid passage defined by a conical seat surface 4. The valve body carries a rotatable stem 5 and a head 6 connected thereto for endwise and rotational movement with the stem. The stem 5 is rotatable relative to head 6 when rotational movement of the latter is resisted, as for example when the seal frictionally engages seat 4. The particular connection illustrated is disclosed in more detail and claimed in the co-pending application of George O. R. Lindgren, Serial No. 537,264, filed May 25, 1944.

The valve seal proper of this invention consists generally of a deformable member to engage the valve seat supported and confined in such a manner that the sealing pressure against the seat increases in proportion to increased pressure applied to the seal in either direction. In the illustrated embodiment, the head 6 carries a screw 7 at its inner end which serves to hold retainer disc 8 against the end of the head and retain the seal 10 on a cylindrical portion 9 of the head and against a shoulder 11 on the head.

The seal 10 comprises an annulus which consists of a rubber-like packing ring 12 and a pair of confining rings 13 and 14 which may be composed of metal or other stiff material. The ring 12 may be made of any suitable natural or synthetic rubber compound which is deformable but substantially incompressible. Synthetic rubber compounds with a durometer reading of about 80 have been found to be satisfactory. Ring 12 is generally triangular in radial cross section and has an inner cylindrical surface 15 to seat on the corresponding surface 16 of cylindrical portion 9 of head 6, and a conical outer surface 18 to engage the conical seating surface 4 of web 3. The ring 13 is axially spaced from the ring 14, defining an annular space into which the ring 12 projects and through which it may be displaced.

The ring 13 includes a radial portion 13a which engages the end surface at the thicker end of ring 12, and a conical portion 13b which engages the adjacent portion of the conical surface 18 of ring 12. The ring 14 includes a radial portion 14a which engages the end surface at the thinner end of the ring 12, and a conical portion 14b which engages the adjacent portion of the conical surface of the ring. It will be noted from Fig. 2 that the inner edge of the radial portion 13a of the ring 13 is spaced from the cylindrical surface 16 which it surrounds, but that the inner edge of the radial portion 14a of the ring 14 is substantially in contact with the surface 16. The rings 13 and 14 are secured to packing 12 in any suitable manner, for example, by being bonded or molded and vulcanized thereto; and when the seal 10 is assembled with head 6 the radial portions 13a and 14a of these rings engage, respectively, the surface 11 on head 6 and the retaining ring 8. The retaining rings 13 and 14 are rendered freely expansible and contractable by one or more slots 19 and 20. Preferably each ring has but one slot. When axial pressure is applied to the valve seal in closed position, either by applied mechanical force or line pressure forces, the retaining rings 13 and 14 are tightly pressed into contact with the seat surface 4, thereby preventing extrusion of the distortable packing ring 12.

The above described apparatus operates substantially as follows: When the conical surface of seal 10 lightly engages the conical seat 4, the parts of the seal occupy positions substantially as shown in Figs. 1 and 2, with the ring 14 engaging the seat 4. When the screw 5 is advanced toward web 3 and the seal 10 is thereby pressed against the seat under greater force, head 6 prevents the ring 14 from compressing radially because its inner surface already substantially engages the surface 16 of cylindrical part 9 of the head. Hence the outer circumference of the ring 14 remains substantially constant, preventing further movement of this ring into the conical seat 4. The ring 14 then constitutes an abutment against which ring 12 may be pressed by head 6, as the cylindrical surface 16 slides through the inner edge of the radial portion 14a. The ring 13 can compress radially by closing the split or its splits 19 because its inner edge is spaced from surface 16 of cylindrical part 9, and thus may move farther into conical seat 4. In this manner the head 6 may move relative to the ring 14 and, as it so moves, ring 12 is subjected to endwise pressure.

Since the ring 12 is substantially non-compressible but deformable, it is displaced outwardly through the annular space between the rings 13 and 14 and engages seat 4 with increased pressure to effect an efficient fluid-tight sealing action. At the same time, the ring 12 compresses into fluid-tight engagement with the cylindrical surface 16. When the pressure on head 6 is relieved, ring 12 resumes substantially its original position due to its inherent resilience.

Substantially the same sealing action takes place from increased fluid pressure applied to either side of the valve. Pressure acting against the upper, or wider, face of the seal 10 tends to move the ring 13 farther into the conical seat 4, with a consequent increase of the radial pressure of the free portion of the ring 12, between the rings 13 and 14, against the seat 4. Pressure acting against the lower, or narrower, face tends to move the ring 14 upwardly, with a consequent increase of the radial pressure of the ring 12 against the seat. During this action the ring 14, if provided with one or more splits 20, expands and remains in contact with the seat 4.

Wiping or rubbing of the deformable ring 12 against the valve seat under pressure is also prevented by the rings 13 and 14. During closing of the valve the rings 13 and 14 first contact the seat 4 and the ring 12 is not expanded into heavy contact with the seat until after the ring 14 has been firmly seated so as to resist further movement. During the slight additional movement required to expand the ring 12 tightly against the seat, the upper corner of the ring is prevented from contacting the seat by the conical portion 13b of the ring 13, the sliding movement of the central portion of the ring 12 against the seat being so slight as to cause no appreciable wear. In opening the valve, this action is reversed, the ring 14 remaining in position until after the expanding pressure on the ring 12 has been relieved.

Although a preferred embodiment of the invention has been described in considerable detail so that others skilled in the art may be able to practice the same, it will be understood that many changes and modifications may be resorted to without departing from the scope of the invention as defined in the following claims.

I claim:

1. A valve comprising a body having a conical seat, an annular seal having a conical surface engageable with said seat and comprising an annulus of substantially non-compressible, deformable material, and axially spaced rings of relatively stiff material surrounding the outer end edges of said annulus, and engageable with said seat, a head having a cylindrical portion on which said annulus is mounted, the ring adjacent to the free end of said cylindrical portion radially engaging said portion, and the other ring being spaced radially from said cylindrical portion under normal pressures, said last mentioned ring being radially compressible, and means for exerting pressure on said head and seal after the latter has engaged said seat and thereby moving said rings relative to each other and deforming said annulus therebetween.

2. In a valve, a body having inlet and outlet chambers and a valve port between said chambers, said valve having a generally conical seating surface, a valve stem movable in said body, and valve means carried by said stem and movable into and out of engagement with said valve seat, said valve means comprising a body of deformable rubber-like material and separate guard means for opposite faces of said body, the guard means for the face of said body nearest the smaller diameter portion of said seat being arranged to confine said rubber-like annulus from axial extrusion, said last-mentioned guard means being formed to engage said seat and block further motion of said valve means along said seat, the other guard means being arranged to engage said seat and confine the associated peripheral portion of said rubber-like body from extrusion, said other guard means being radially compressible after engagement with said seat, the periphery of said rubber-like body member disposed between said separate guard means being entirely confined by the conical valve seat with the valve closed, said stem including means for engaging said valve means adjacent said other guard means, motion of said parts to close the valve causing said second-named guard means to advance toward said first-named guard means to press the confined periphery of said rubber-like body radially against said seat.

FRANK J. RAYBOULD.

REFERENCES CITED

The following references are of record in the file of this patent:

UNITED STATES PATENTS

| Number | Name | Date |
| --- | --- | --- |
| 21,332 | Fuller | Aug. 31, 1858 |
| 1,311,954 | Dally | Aug. 5, 1919 |
| 1,955,832 | Raybould | Apr. 24, 1934 |